ated Patent [19]

United States Patent [19]

Przytulla

[11] Patent Number: 5,044,923
[45] Date of Patent: Sep. 3, 1991

[54] DEVICE FOR BLOW MOLDING A HOLLOW BODY

[75] Inventor: Dietmar Przytulla, Kerpen, Fed. Rep. of Germany

[73] Assignee: Mauser-Werke GmbH, Bruehl, Fed. Rep. of Germany

[21] Appl. No.: 504,490

[22] Filed: Apr. 4, 1990

[30] Foreign Application Priority Data

Apr. 21, 1989 [DE] Fed. Rep. of Germany ....... 3913087

[51] Int. Cl.$^5$ .............................................. B29C 49/20
[52] U.S. Cl. ................... 425/525; 220/85 H; 264/534; 425/522
[58] Field of Search ................ 425/522, 525; 264/531, 264/533, 534; 220/319, 320, 355, 85 D, 85 H; 215/275, 100 A

[56] References Cited

U.S. PATENT DOCUMENTS

| 4,086,314 | 4/1978 | Lampart et al. | 425/525 X |
| 4,095,927 | 6/1978 | Roberg et al. | 425/525 |
| 4,117,062 | 9/1978 | Uhlig | 425/525 X |
| 4,177,934 | 12/1979 | Hammes et al. | 220/319 |
| 4,228,122 | 10/1982 | Hammes | 264/534 |
| 4,378,328 | 3/1983 | Przytulla et al. | 264/534 |
| 4,529,570 | 7/1985 | Przytulla | 264/534 |

FOREIGN PATENT DOCUMENTS 1174968 7/1964 Fed. Rep. of Germany .
8627708 10/1986 Fed. Rep. of Germany .

Primary Examiner—Richard L. Chiesa
Attorney, Agent, or Firm—Pennie & Edmonds

[57] ABSTRACT

Device for blow molding a hollow body with a blow molding device in which at least two solid flange rings are molded in the circumferential wall of the hollow body from the same thermoplastic synthetic material of the hollow body. The flanges are formed by compressing and fusing the material with a tandem slide. The movable slide parts travel unlike distances at unlike speeds of movement.

4 Claims, 2 Drawing Sheets

DEVICE FOR BLOW MOLDING A HOLLOW BODY

BACKGROUND OF THE INVENTION

Devices are known for blow molding a hollow body of thermoplastic synthetic material having a flange ring projecting outward from the circumferential wall of the hollow body. These blow molding devices typically have a recess along a continuous annular region in which an external flange ring of the hollow body is formed after the initial blowing process. The flange ring is produced by compressing the wall portion of the hollow body, where it is located in the annual recess, into a solid ring by driving a movable mold slide in an axial direction toward another mold part.

Flanges on vessels of synthetic material may be made using a prefabricated flange part. Thus it is known, for example, that a prefabricated flange may be placed in a blow molding device as a separate injection molded part. This flange may then be welded on the outer wall of the vessel in the manufacturing process or blow molding of the vessel.

The flange rings formed by blow molding from the wall of the hollow body or with a prefabricated flange part are used in closed hollow bodies, for example, bunged vessels, as roll hoops or transport rings. In parallelpiped hollow bodies, the closed flanged projections alternatively serve as wall reinforcements.

Vessels of synthetic material capable of use with lids of synthetic material; that is, the so-called wide-mouth drums, are generally understood to include large-volume containers or vessels, for example, of 220-L capacity, having a fill opening and a lid which is essentially the same size as the diameter of the vessel. In these constructions, the flange ring of the vessel consists of a compressed surface flange which, for example, pursuant to U.S. Pat. No. 4,177,934 is arranged at some distance under the vessel opening. Against this flange rests a cooperating flange of the turned-up lid of the vessel. The lid, in turn, sits on the neck of the opening of the vessel.

The lid-edge flange conforms in its radial extension with the surface flange of the vessel and transmits stacking forces into the wall of the vessel in the axial direction. In the locked position, the lid is fastened on the vessel by a clamping ring engaging over the lid edge flange on the one hand and engaging under the vessel surface flange on the other.

Lids of hard synthetic material for vessels are customarily pre-fabricated as injection molded parts in a separate operation. In addition to a separate injection molding manufacturing process, special injection molding tools are likewise required for this.

SUMMARY OF THE INVENTION

In accordance with the present invention, the vessel and lid are produced in one operation in the blow-molding process using a single blow molding device. Pursuant to the invention, this is accomplished by means of a structural blow-molding device having two annular, axially displaceable mold slides.

Owing to the special design of the blow-molding device, with the two axially displaceable or tandem slides, the vessel and lid production may be combined in a single device. This substantially speeds up manufacture and makes it less costly. Additional machine and tool expenditures are eliminated.

Joint vessel and lid production is effected by the method pursuant to the invention by means of a single blow molding device in that the hollow body and an associated lid are simultaneously blown in the blow molding device in one operation. After molding of the finished blown product, the lid or a disposable connecting ring lying between the lid and the body of the vessel need only be separated from the latter make the body of the vessel and the lid independent.

The invention is not limited to rotationally symmetric hollow bodies, for example drums; but alternatively relates to parallelpiped hollow bodies such as, for example, canisters or bottle-like containers with, for example, a rectangular or square cross section.

DESCRIPTION OF THE PREFERRED EMBODIMENT

Figure 1:
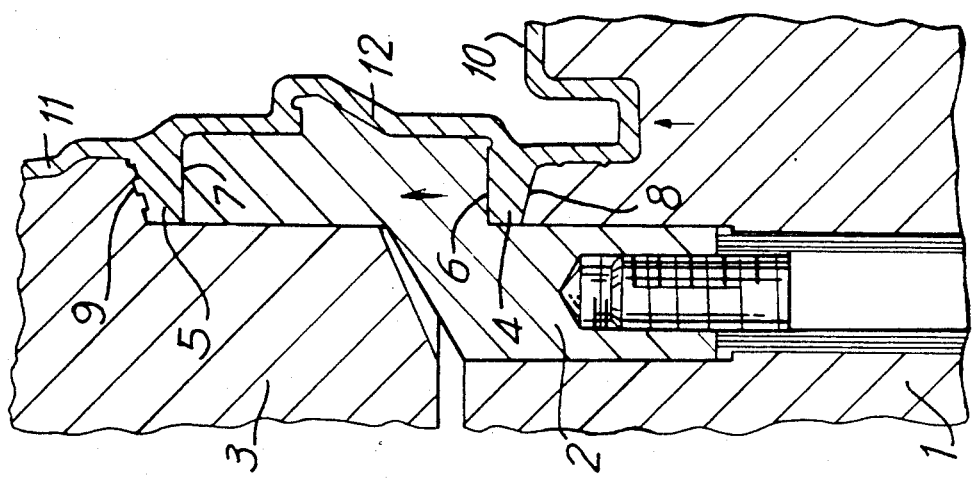
FIG. 1 is a partial cross-sectional view of the blow molding device with the slides open and the blown tube of synthetic material disposed against the wall of the molding device.

For better visualization, only the mold sector of interest to an understanding of the invention is shown in the drawings.

According to FIG. 1, an annular mold slide 2 is inserted between the mold slide 1 and the stationary mold part 3. Both mold slides are displaceably guided in the direction of the axis of the mold. One end of the mold slide 2 is slidable in the mold slide 1 and the other end in the stationary mold part 3.

When the mold is open, the blown tube 13 of synthetic material rests against the inner contours of the mold, as shown in FIG. 1. An annular recess 4 is defined by the face 6 of the annular slide 2 and the face 8 of the mold slide 1. This annular recess contains the material from which the flange on the lid is to be formed. The face 7 of the annular slide 2 and the face 9 of the stationary mold part 3 define a second annular recess 5. This annular recess contains the material from which the flange on the vessel for the vessel is to be formed. The circumferential walls in the corresponding mold parts 2 and 3 define the radial extension of the annular recesses 4 and 5.

In the still weldable hot state of the blown tube 13, mold slide 1 and annular slide 2 are moved axially of the mold in the direction of the stationary mold part 3. The speed of movement of the annular slide 2 is lower and its extent of movement is shorter than the speed of movement and extent of movement of the mold slide 1.

Figure 2:
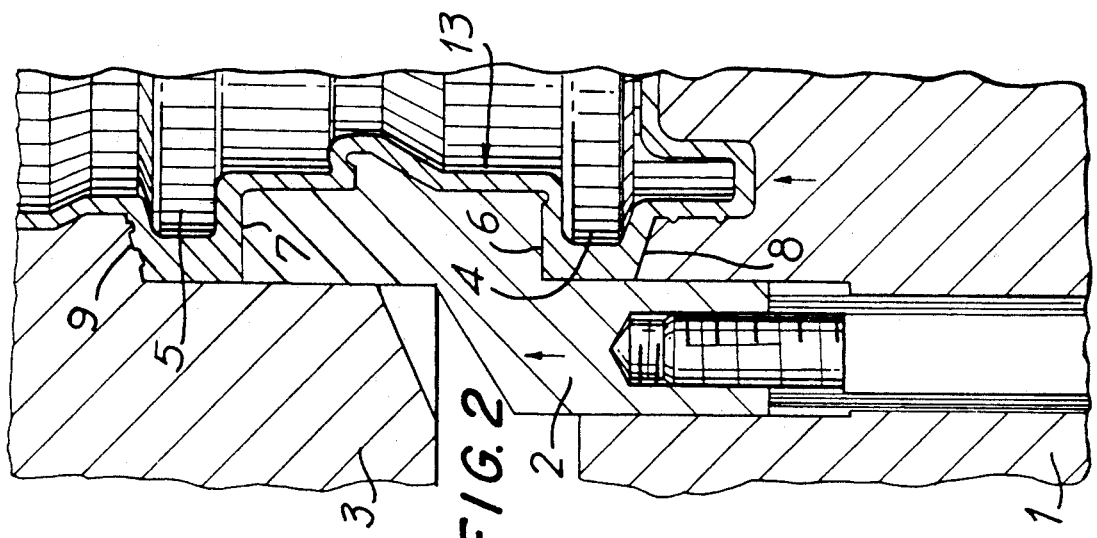
FIG. 2 is a view similar to FIG. 1 with the slides moved in the direction of the axis of the mold.

FIG. 2 shows the blow molding device in a state in which the displaceable mold parts 1 and 2 have traveled about half the closing path in the direction of the arrow. Then only the tube material lying in the annular recesses 4 and 5 is pressed together until, according to the end position shown in FIG. 3, it is compressed and fused into the solid flange rings 14 and 15 (FIG. 4). The movable mold parts 1 and 2 reach their end position of travel at the same time.

Figure 3:
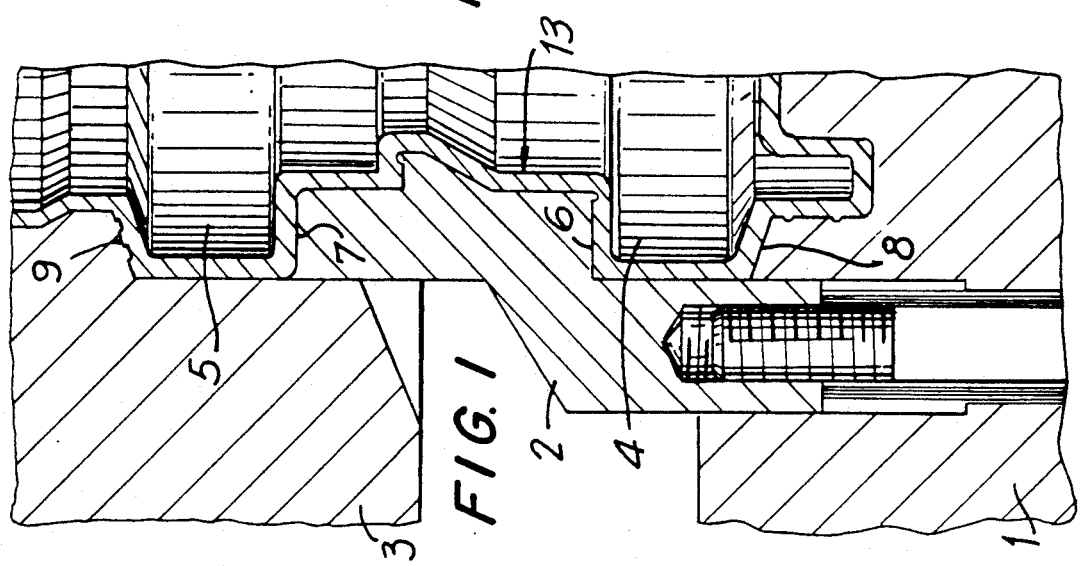
FIG. 3 is a view similar to FIG. 1 with the slides closed.
Figure 4:
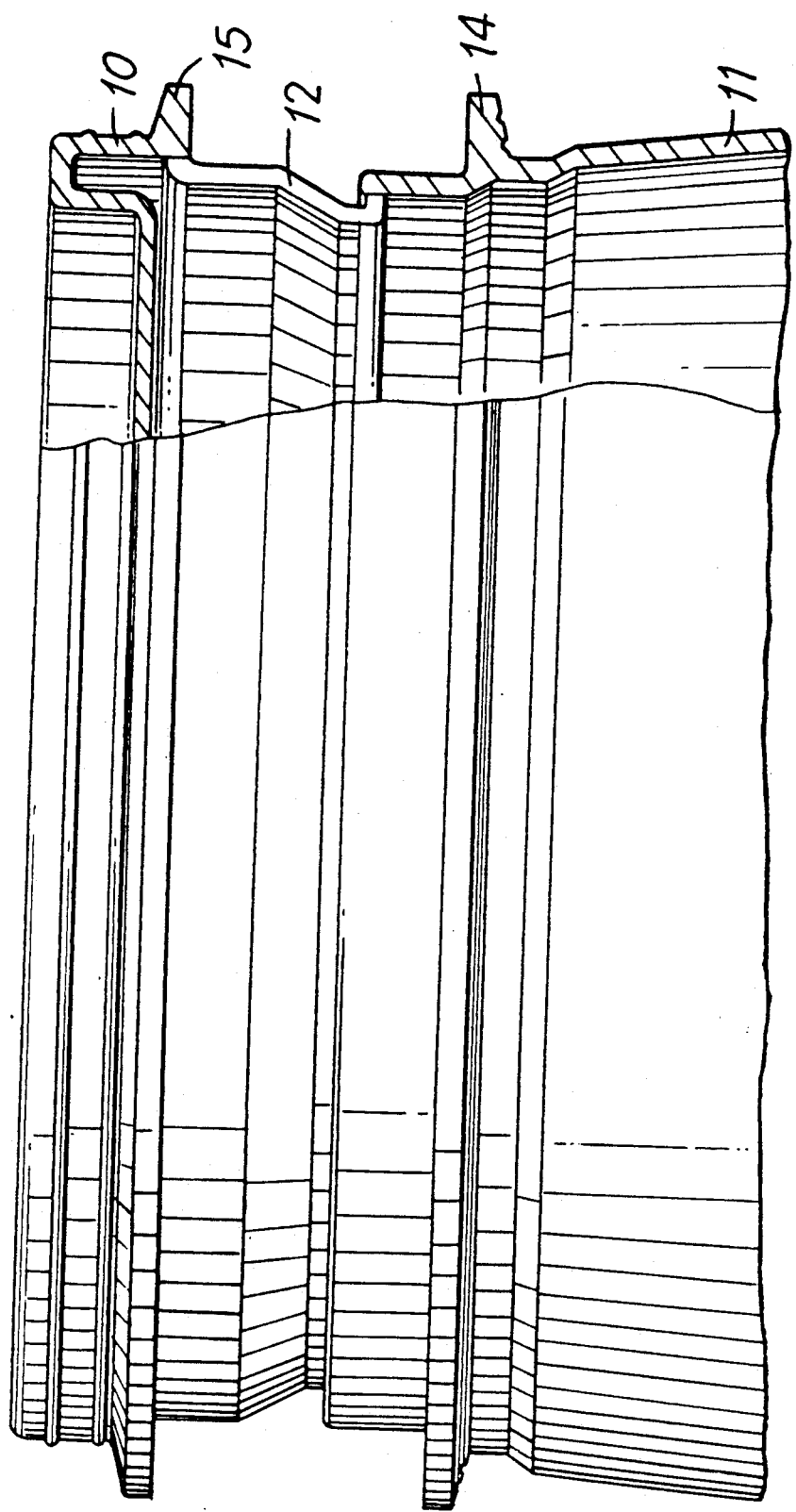
FIG. 4 is a view of the vessel-lid unit, partly in cross-section, after removal from the blow molding device.

In FIG. 4, the cross-sectional part of the vessel-lid unit taken from the side of the vessel as shown in FIGS. 1-3 and inverted. It is to be added that the whole mold is divided in two in the longitudinal or axial direction and the two mold halves are movable transversely of the longitudinal direction into the opening and closing positions.

In FIG. 4 the vessel 11 and lid 10 are still joined by an intermediate annular member 12. This disposable connecting ring 12 between vessel 11 and lid 10 is next cut out, so that vessel 11 and lid 10 become independent parts. For better identification, the ring 12 to be severed is not shaded in FIG. 4. The blow molding device may alternatively be designed so that the disposable intermediate ring 12 is eliminated.

With the present invention, the vessel and lid consist of the same synthetic material formed from a single blown tube and have a like grain. Thus the vessel and lid have the same color.

I claim:

1. A blow molding device for blow molding a hollow body of thermoplastic synthetic material having two flange rings projecting radially outwardly from the circumferential wall of the hollow body, the device comprising:
   a) a stationary blow mold part (3);
   b) a first mold slide (2) displaceable axially with respect to said stationary mold part (3) between a first position and second position, said first mold slide having a first mold portion spaced axially from said mold part to define a first annular recess (5) therebetween when said first mold slide is in said first position and for producing a first flange ring (14) on the circumferential wall of said hollow body upon axial movement of said first mold slide (2) to said second position; and
   c) a second mold slide (1) displaceable axially with respect to said first mold slide (2) between a first position and a second position, said second mold slide having a second mold portion spaced axially from the first mold slide, on the axial side thereof opposite said stationary mold part (3), to define a second annular recess (4) therebetween when said second mold slide is in said first position and for producing a second flange ring (15) in the circumferential wall of said hollow body upon axial movement of said second mold slide to said second position.

2. A blow molding device according to claim 1 wherein:
   a) the stationary mold part includes a face (9) facing axially toward said first mold slide;
   b) the first mold portion of said first mold slide (2) includes a first face (7) facing axially toward said stationary mold part in axial alignment with the face (9) thereof to define said first annular recess;
   c) the first mold slide includes a second face (6), facing axially toward said second mold slide; and
   d) the second mold portion of said second mold slide includes a face (8) facing axially toward said first mold slide and in axial alignment with the second face (6) thereof to define said second annular recess.

3. A blow molding device according to claim 1 wherein:
   a) the first mold slide (2) is slidably mounted on said second mold slide (1) for simultaneous axial movement therewith.

4. A blow molding device according to claim 1 wherein:
   a) the first mold slide (2) is slidably mounted on said second mold slide (1) for simultaneous axial sliding movement therewith, from said first position to said second position and at a speed less than the speed of axial movement of said second mold slide from said first position to said second position, with both mold slides reaching their second position at the same time.

* * * * *